US007690802B2

(12) United States Patent
Higley et al.

(10) Patent No.: US 7,690,802 B2
(45) Date of Patent: Apr. 6, 2010

(54) LIGHT EMITTING DIODE EMERGENCY LIGHTING METHODS AND APPARATUS

(75) Inventors: Robert Edward Higley, Durham, NC (US); Mark Terrence McClear, Cary, NC (US)

(73) Assignee: Cree, Inc., Durham, NC (US)

( * ) Notice: Subject to any disclaimer, the term of this patent is extended or adjusted under 35 U.S.C. 154(b) by 257 days.

(21) Appl. No.: 11/736,181

(22) Filed: Apr. 17, 2007

(65) Prior Publication Data
US 2008/0258628 A1 Oct. 23, 2008

(51) Int. Cl.
*F21V 19/04* (2006.01)
(52) U.S. Cl. ............... 362/20; 362/276; 362/295; 362/800
(58) Field of Classification Search ............ 362/20, 362/800, 183, 251, 295, 394, 276, 254, 411
See application file for complete search history.

(56) References Cited

U.S. PATENT DOCUMENTS

| 5,365,145 | A | * | 11/1994 | Fields | 315/86 |
|---|---|---|---|---|---|
| 5,410,453 | A | * | 4/1995 | Ruskouski | 362/20 |
| 6,010,228 | A | * | 1/2000 | Blackman et al. | 362/95 |
| 6,663,248 | B2 | * | 12/2003 | Hsieh | 362/20 |
| 6,994,452 | B2 | * | 2/2006 | Rozenberg et al. | 362/252 |
| 7,234,844 | B2 | | 6/2007 | Bolta et al. | |
| 2001/0014020 | A1 | * | 8/2001 | Son | 362/259 |
| 2005/0057353 | A1 | * | 3/2005 | Barrieau et al. | 340/506 |
| 2008/0180935 | A1 | * | 7/2008 | Burdeen et al. | 362/20 |

\* cited by examiner

*Primary Examiner*—Bao Q Truong
(74) *Attorney, Agent, or Firm*—Priest & Goldstein, PLLC

(57) ABSTRACT

An LED based emergency lighting system is described. Unlike a typical approach in which one lighting system provides normal ambient lighting and a second different system provides auxiliary emergency lighting, a common integrated system can be satisfactorily employed.

22 Claims, 7 Drawing Sheets

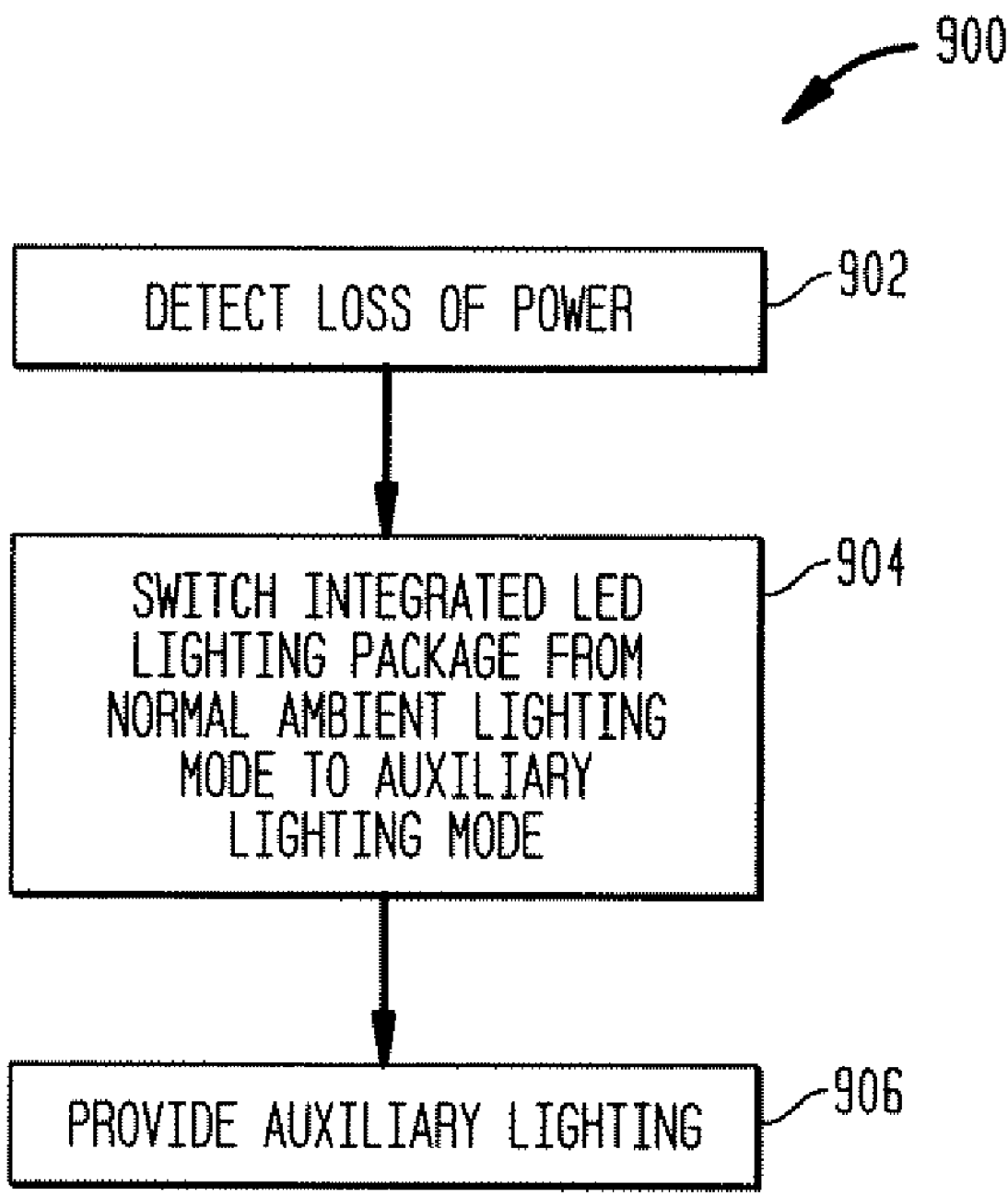

LIGHT EMITTING DIODE EMERGENCY LIGHTING METHODS AND APPARATUS

FIELD OF THE INVENTION

The present invention relates generally to improvements in the field of emergency lighting, and, in particular, to methods and apparatus for providing advantageous approaches to emergency lighting employing light emitting diode-based light fixtures, also referred to as LED fixtures.

BACKGROUND OF THE INVENTION

LED lighting systems are becoming more prevalent as replacements for existing lighting systems. LEDs are an example of solid state lighting and are superior to traditional lighting solutions such as incandescent and fluorescent lighting because they use far less energy, are far more durable, operate longer, can be combined in red-blue-green arrays that can be controlled to deliver virtually any color light, and contain no lead or mercury. As LEDs replace the typical fluorescent light fixtures found in many workplaces, as well as elsewhere, the present invention recognizes that an LED fixture in accordance with the present invention can be utilized to replace such fixtures, as well as, the separate emergency lighting fixture often employed in certain environments in conjunction with such fixtures.

One common fluorescent lighting fixture is a luminaire fixture 100 shown illustratively in FIG. 1. Fixture 100 may suitably comprise a 2' by 4' metal box or compartment 102 having a plurality of fluorescent bulbs 104, 106 and 108. While a 2' by 4' fluorescent fixture is discussed here as exemplary, it will be recognized that many other sizes of fluorescent fixture and various incandescent fixtures are also common. Each fluorescent bulb, such as bulb 108, is inserted in an electrical socket, and located within a reflective subassembly 110. The compartment 102 also typically has a reflective back surface, such as a white painted interior surface and a plastic cover mounted in a hinged door (not shown) which swings open to allow the bulbs to be easily accessed and changed. A typical office may have several such fixtures mounted to the ceiling of each room to provide room lighting. By way of example, an approximately 12'×20' office might have three such fixtures mounted to its ceiling to provide ambient room lighting. Other facilities will employ a wide variety of known arrangements of lighting fixtures selected to meet the context and the environment to be lighted.

Taking our 12'×20' office example, however, FIG. 2 shows a cutaway portion of a corner of such a room 200 having a door 202, and a luminaire fixture 204 mounted in the ceiling. Where the office is an interior office without windows or in a variety of other circumstances, an emergency lighting fixture such as fixture 206 of FIG. 2 may be required to be mounted above an exit door, such as the door 202 so that when power is lost during a power outage, a battery in fixture 206 will cause halogen lamps 207 and 208 to light allowing any occupants of room 200 to safely find the door 202 and leave the room. Halogen lamps typically have lighting characteristics very different from the light sources that light the room under normal conditions. While the room 200 is discussed as exemplary, it will be recognized that door 202 could be an exit door at the end of a long hallway, the door to leave an office, the door of a large interior conference room, a gymnasium, a mailroom or other work area, or the like. Similarly, an auxiliary lighting fixture could be mounted along an interior hallway, in a basement, or elsewhere, in addition to near an exit door. Regardless, in an arrangement like that shown in FIG. 2, the main light source goes off when power is lost and a separate auxiliary emergency backup goes on. Such an arrangement has several disadvantages including the extra cost of a separate auxiliary system, maintenance of such a system and the poor aesthetic appearance of some such systems, for example.

SUMMARY OF THE INVENTION

As discussed below, among its several aspects, the present invention recognizes the desirability of providing an LED-based emergency light system.

According to one aspect of the present invention, an integrated light emitting diode (LED) lighting package is utilized to provide both ambient room lighting and auxiliary emergency lighting. The integrated package may suitably comprise an array of LEDs powered by an alternating current power source and providing ambient lighting in a normal mode of operation, a battery supply, and a control circuit to deliver power from the battery supply to at least a plurality of the LEDs in the array of LEDs upon loss of power from the alternating current power source to provide auxiliary emergency lighting in an auxiliary mode. In one such system, one or more of columns, but less than all of the columns of LEDs in the array light at full brightness in the auxiliary mode. In another exemplary system, all of the LEDs are lit, but more dimly in the auxiliary mode. In a presently preferred embodiment of such a system, pulse width modulation is employed to provide dimming of the LEDs. Further, with a smart control system, integrated LED systems can provide a wide variety of features not provided by typical fluorescent lights supplemented by battery powered auxiliary halogen lamps.

A more complete understanding of the present invention, as well as other features and advantages of the invention, will be apparent from the following detailed description, the accompanying drawings, and the claims.

BRIEF DESCRIPTION OF THE DRAWINGS

FIG. 9 is a flowchart of an emergency lighting process in accordance with the present invention.

DETAILED DESCRIPTION

Figure 1:
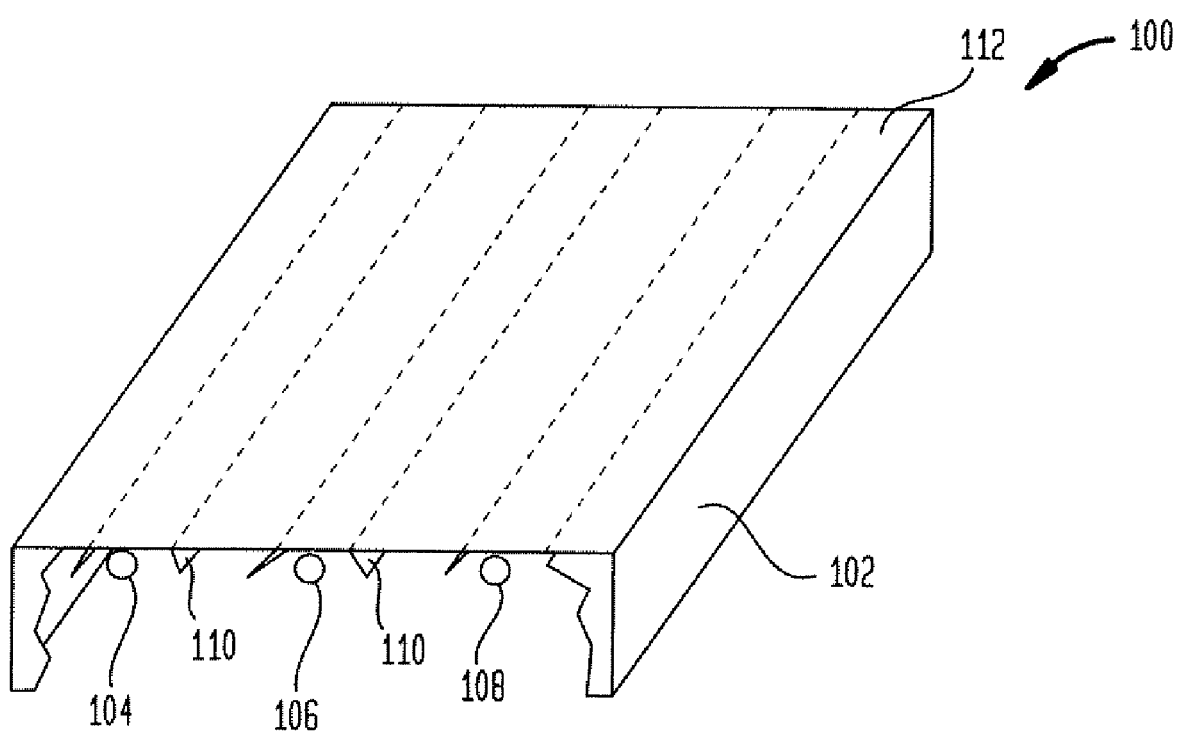
FIG. 1 illustrates a luminaire lighting fixture employing fluorescent bulbs as a lighting source.
Figure 2:
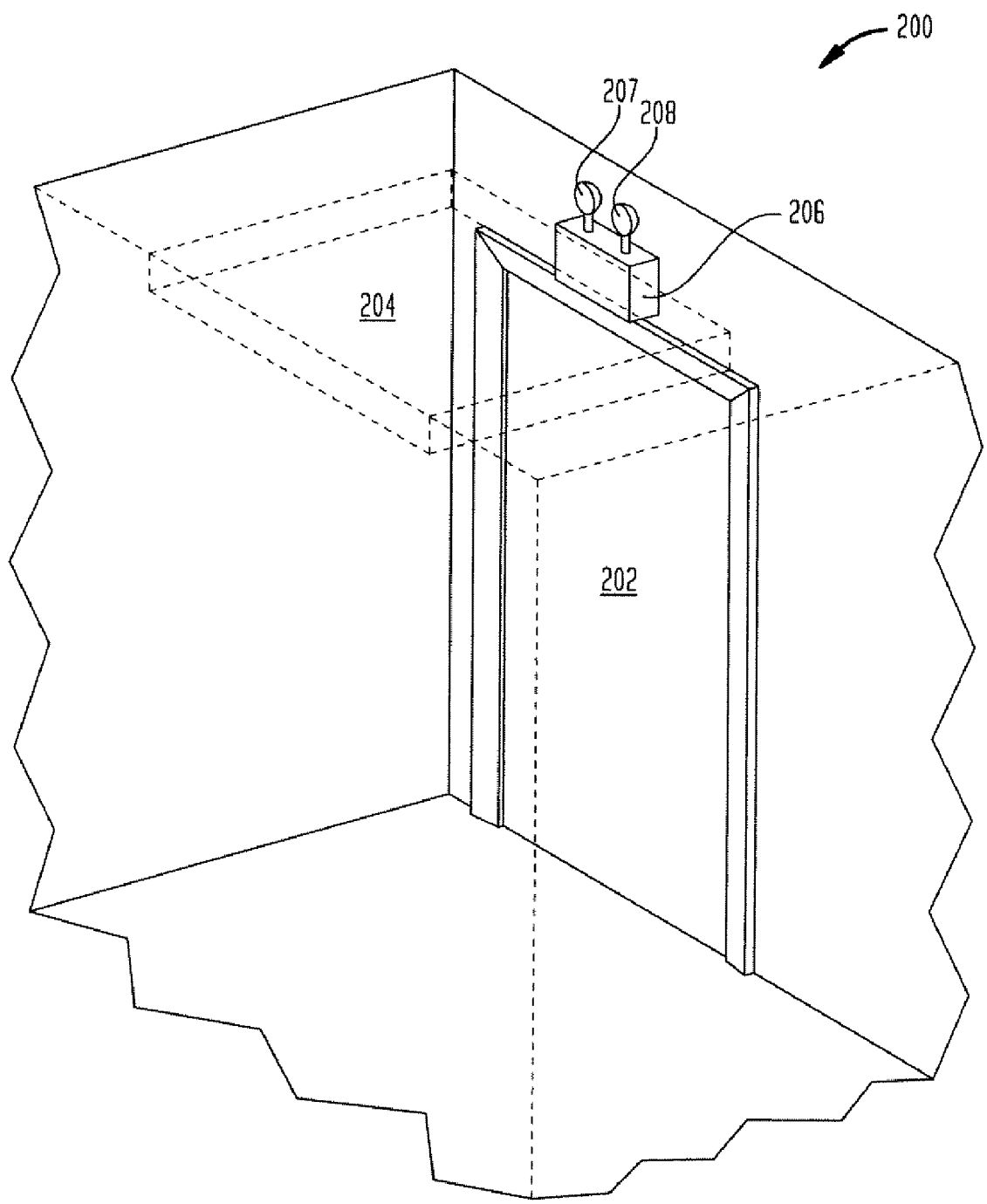
FIG. 2 illustrates a typical prior art emergency lighting arrangement in which fluorescent luminaries light a room under normal conditions and a separate supplemental emergency light fixture provides light when the regular power goes out.
Figure 3:
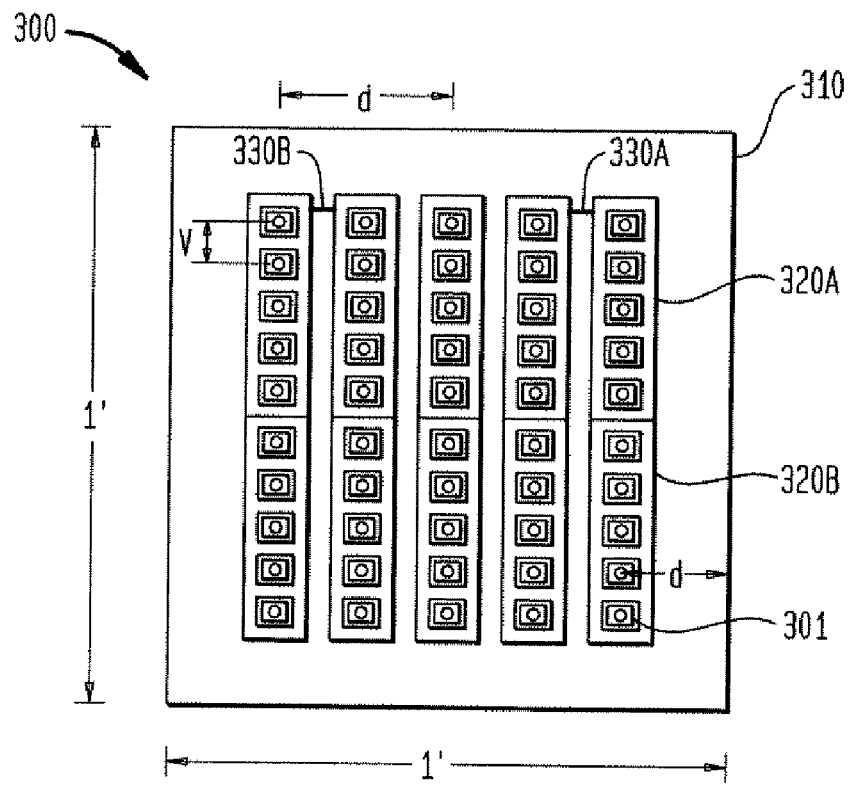
FIG. 3 shows a top view of a 1 foot×1 foot LED light package with integrated emergency lighting in accordance with the present invention.

FIG. 3A shows a top view of a 1 foot×1 foot light emitting diode (LED) lighting package 300 in accordance with the present invention. The LED lighting package 300 includes a backing 310 of thermally conductive material such as aluminum. Backing 310 as shown in FIG. 3 is a planar sheet of aluminum with a thickness of approximately 1/16 inch. It should be noted that other backing constructs may provide additional heat dissipation properties and can be employed as the backing 310. For example, the patent applications entitled "Light Emitting Diode Lighting Package with Improved Heat Sink" and "Light Emitting Diode Packages" having U.S. Ser. Nos. 11/379,726 and 11/379,709, respectively, both filed on Apr. 21, 2006 and assigned to the assignee of the present application, address additional backing structures and details of LED lighting packages, and are incorporated by reference herein in their entirety. It will be recognized that other thermally conductive materials such as ceramics, plastics, and the like may be utilized. Aluminum is presently preferable because of its abundance and relatively cheap cost.

Figure 4:
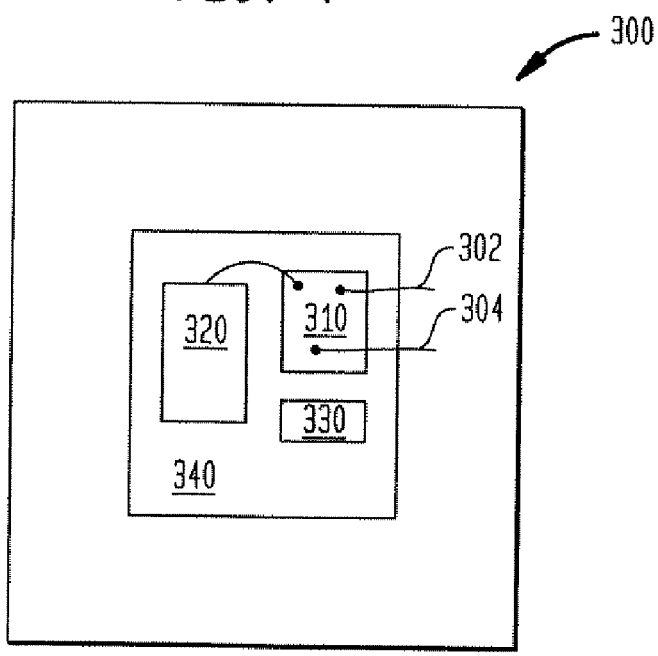
FIG. 4 shows a bottom view of the lighting package of FIG. 3.

The LED lighting package 300 includes five columns of LEDs. Each column includes two printed circuit boards (PCBs) such as PCB 320A and 320B. On each PCB, five LEDs such as LED 301 are mounted and are electrically serially connected. Each LED may suitably be an XLamp™ 7090 available from Cree, Inc. or the like. Each PCB includes a positive voltage terminal and a negative voltage terminal (not shown). The negative voltage terminal of PCB 320A is electrically serially connected to the positive voltage terminal of PCB 320B so that the ten LEDs defining a column are electrically serially connected. It should be recognized that although two PCBs are shown to construct one column of LEDs, a single PCB with ten LEDs may also be utilized for a particular column of LEDs. Further, while particular numbers and arrangements of LEDs are described herein, widely differing arrangements may and likely will be suitably employed taking into consideration the lighting context and the evolution of LED sources. In the embodiment of FIGS. 3 and 4, the right two columns of ten LEDs are electrically connected in parallel by wire 330A, and the left two columns are connected in parallel by wire 330B. The center column is separately wired as discussed further below. The backing 310 is preferably anodized with a white gloss to reflect the light emitted from the LEDs.

As discussed in greater detail below, in one exemplary embodiment of the LED lighting package 300, the package 300 operates in a first normal power mode in which power is being supplied by electrical power lines, such as building wiring, in a normal manner. In this mode of operation, all 50 LEDs in the five columns are lit to provide normal ambient room lighting. When normal power is lost during a power outage, that power loss is detected and the package 300 operates in a second mode in which power is battery supplied. In this auxiliary battery mode, only one column of LEDs is lit to provide emergency lighting so that occupants of a building, for example, can move safely to the exit and leave the building.

FIG. 4 shows a bottom view of the lighting package 300 illustrating an exemplary arrangement of components to supply power to the LEDs during both modes of operation. In FIG. 4, AC power leads 302 and 304 connect lamp assembly 300 to a source of AC power when lamp assembly 300 is installed. For example, leads 302 and 304 are connected to the AC wiring of a building when assembly 300 is mounted in the ceiling of an office in the building. Under normal operation, power flows through the leads 302 and 304 to a printed circuit control board which controls the operation of lamp assembly 300. A backup battery 320, such as a Shimatsu valve regulated lead-acid battery NP 3.2-6.6 V 3.2 Ah, has its charge maintained by a charging circuit when normal power is supplied. An LED driver circuit 330, such as a 4015 Boost Puck, from Lux Drive™, a division of LED Dynamics, Inc., provides the power to the LEDs of lamp assembly 300 during battery operation as discussed further below in connection with FIG. 7. The printed circuit board 310, backup battery 320 and LED driver circuit 330 are all mounted on a mounting bracket 340 attached to a bottom surface of lamp assembly 300.

Figure 5:
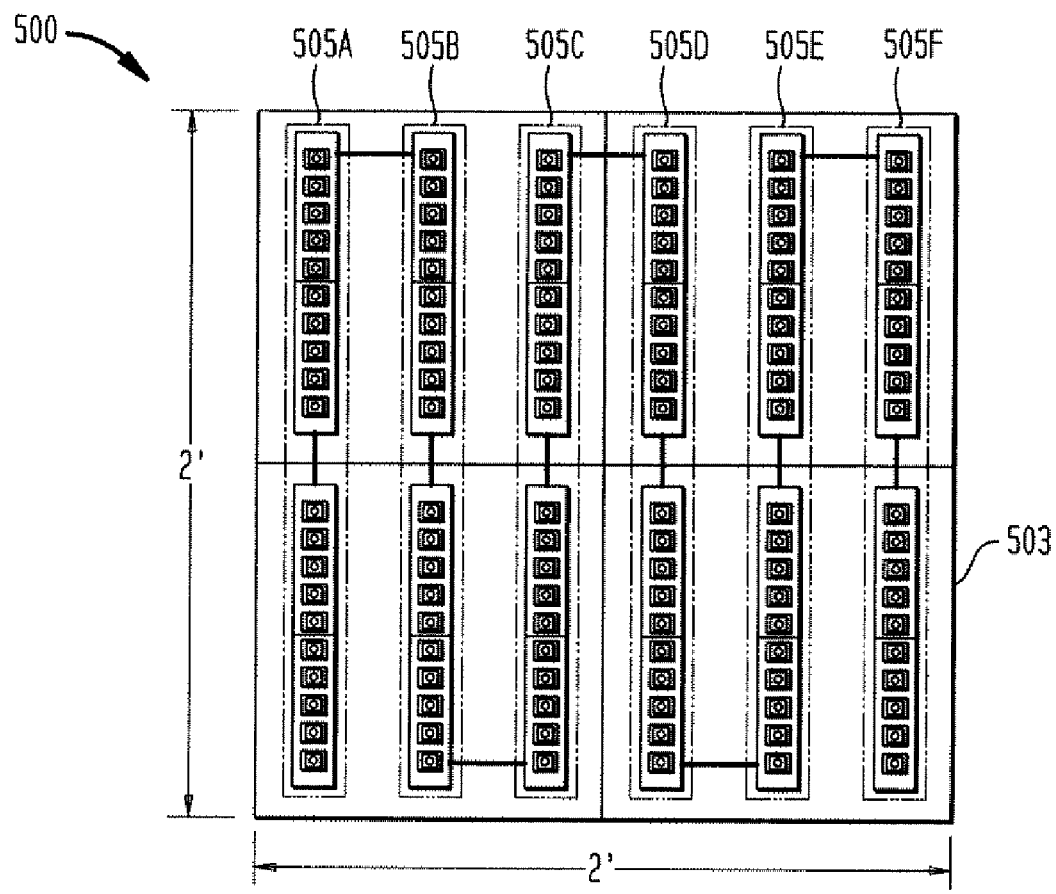
FIG. 5 shows a top view of a 2 feet×2 feet LED lighting package with integrated emergency lighting in accordance with the present invention.

FIG. 5 is a top view illustrating aspects of a 2 feet×2 feet LED lighting package 500. LED lighting package 500 comprises six columns 505A-505F of twenty LEDs. The LEDs in a particular column are electrically connected in serial with their nearest neighbor in the column. As discussed in greater detail below, in one exemplary embodiment of the LED lighting package 500, the package 500 operates in a first normal power mode in which power is being supplied by AC electrical power lines in a normal manner. In this mode of operation, all 120 LEDS in the six columns are lit to provide normal ambient room lighting. When normal power is lost during a power outage, that power loss is detected and the package 500 operates in a second mode in which power is battery supplied and all LEDs remain lit at a reduced power to provide light for building occupants to move to the exit and to safely leave the area that has lost power. Dimming of the power outputs of the LEDs is preferably accomplished utilizing pulse width modulation (PWM) of the power supplied to the LEDs.

Figure 6:
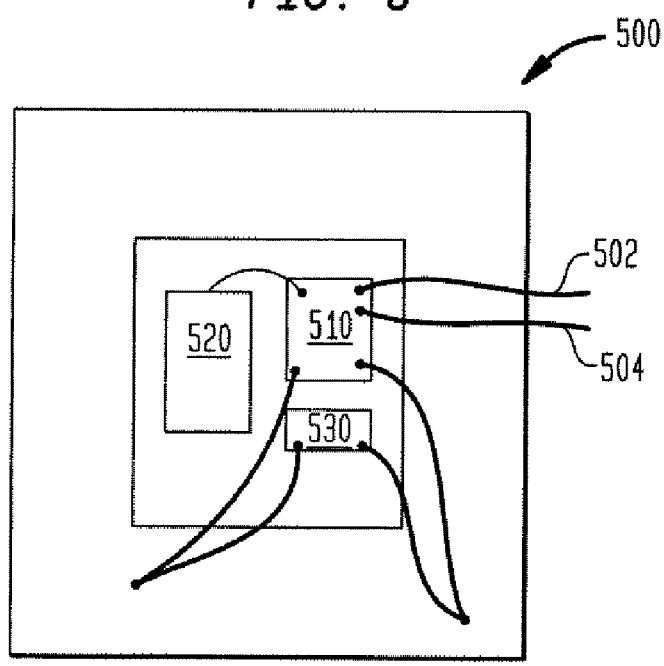
FIG. 6 shows a bottom view of the lighting package of FIG. 5.

FIG. 6 is a bottom view of the LED lighting package 500. In FIG. 6, AC power leads 502 and 504 connect lamp assembly 500 to a source of AC power when lamp assembly 500 is installed. For example, leads 502 and 504 are connected to the AC wiring of a building when assembly 500 is mounted in the ceiling of an office in the building. Under normal operation, AC power flows through the leads 502 and 504 to a printed circuit board 510 which controls the operation of lamp assembly 500. A backup battery 520, such as the previously mentioned Shimatsu valve regulated lead-acid battery, has its charge maintained when normal power is supplied. LED driver circuit 530 converts the AC power to DC and provides that power to the LEDs of lamp assembly 500. When the power is lost, battery power is supplied to the driver circuit and to the LEDs. The printed circuit board 510, backup battery 520 and driver circuit 530 are all mounted on a mounting bracket 540 mounted to a bottom surface of lamp assembly 500.

It should be noted that the dimensions defining the size of LED lighting packages, materials, the numbers of LEDs and the like are illustrative and exemplary and that other packages, such as those shown in the two applications incorporated by reference above, or alternatives thereto may be employed as desired to suit a particular lighting environment and context.

Figure 7:
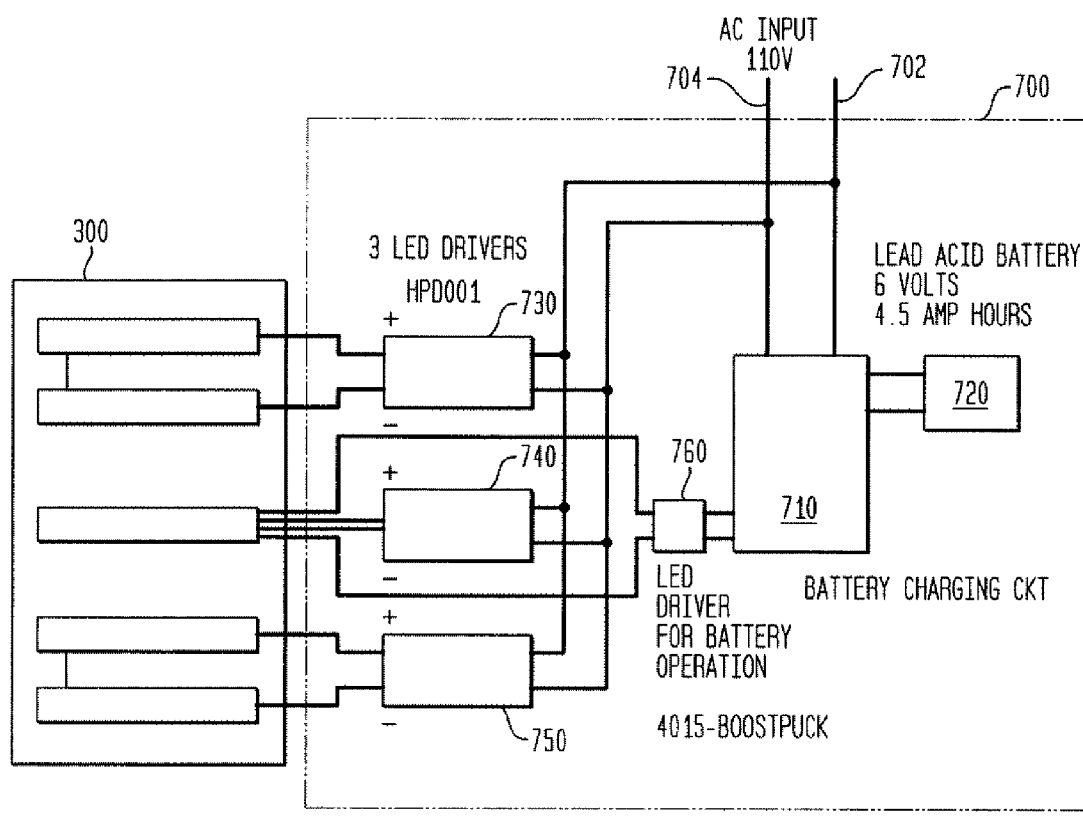
FIG. 7 shows an illustrative auxiliary lighting driver and charging circuit in accordance with the present invention suitable for use in conjunction with the lighting package of FIG. 3.

FIG. 7 shows further details of an exemplary control circuit 700 for use in conjunction with the lamp assembly 300 of FIG. 3. In FIG. 7, leads 702 and 704 are shown connected to a 110V AC input. These leads are also connected to a battery charging circuit 710 which is connected in turn to a 6V, 4.5 amp hour lead acid battery 720. The leads 702 and 704 are also connected to three LED driver circuits 730, 740 and 750, such as HPD001. The three LED circuits drive the five columns of 10 LEDs as shown in FIG. 7. Driver circuit 730 drives two columns. Driver circuit 750 drives two columns. Driver circuit 740 drives one column. For battery operation, battery power is supplied from battery 720 through LED driver 760 to driver circuit 740 which drives a single column, such as the center column of 10 LEDs of lamp assembly 300. While FIG. 7 shows an exemplary control circuit, it will be recognized that a wide variety of alternative control systems may be employed. More complex control systems, such as the processor based system of FIG. 8 may be employed; however, for some applications a very simple control arrangement may be employed. By way of example, an appropriately sized capacitor might replace the battery. During normal power operation, the capacitor would maintain full charge. When line power was lost, a simple switch arrangement could be employed to switch power from the capacitor to drive the lighting arrangement.

Figure 8:
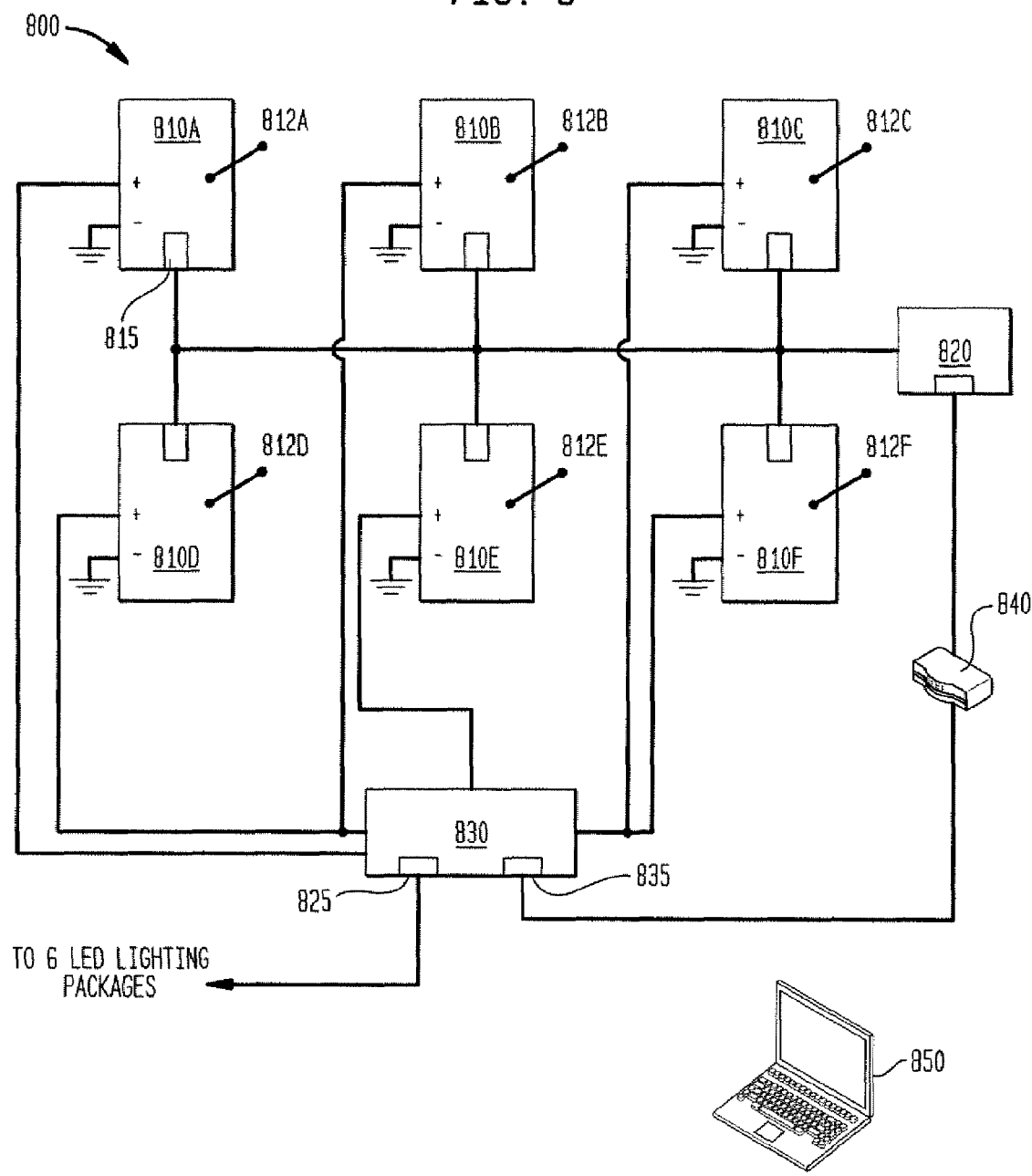
FIG. 8 shows a control system for a plurality of integrated lighting systems like those of FIGS. 3-6.

FIG. 8 shows a smart control system 800 for up to six LED lighting packages, such as packages 300 or 500, according to the present invention. Control system 800 may be suitably employed to selectively apply power to one or more of six LED lighting packages 810A, 810B, 810C, 810D, 810E and 810F, and to vary the brightness of one or more of the six LED lighting packages. During brightness adjustment, the activated LED lighting packages may be adjusted together so as to output the same brightness level selectively to provide auxiliary lighting as needed, or selectively to provide different levels of ambient lighting as needed or desired.

Control system 800 includes six direct current (DC) power supplies one for each of up to six lamp assemblies 810A-810F, a potentiometer 820, and an Ethernet control relay switch. Each power supply supplies power to a corresponding LED lighting package 810A-810F which may suitably be a lighting package 300 or 500 or a combination of such packages. For the sake of simplicity, only one power supply for lighting package 810A will be described in detail here, but power supplies for lighting packages 810B-810F may suitably be similar and employ similar or identical equipment. Alternatively, power supplies for the packages 810B-810F may employ different equipment from that for package 810A and from one another, so long as they are able to communicate with potentiometer 820. The power supplies for lighting packages 810A-810F may be suitably a constant current supply with appropriate wattage such as model PS1-150W-36, manufactured by PowerSupply1. The power supplies have a positive DC output terminal electrically connected to Ethernet control relay switch 830 and a negative DC output terminal electrically connected to ground. The power supplies also have an analog control port such as analog control port 815 which is electrically connected to potentiometer 820. The potentiometer 820 preferably includes an Ethernet control port and is preferably connected to a wireless router 840. Potentiometer 820 is well known and may include generally available 1 kilohm, 1 watt potentiometer having an integrated Ethernet connection. The Ethernet control relay switch 830 includes at least six output ports such as output port 825. Each output port is electrically connected to a corresponding LED lighting package. The Ethernet control relay switch 830 also includes an Ethernet control port 835 which is preferably connected to the wireless router 840. Ethernet control relay switch 830 may suitably be a Smart Relay Controller, manufactured by 6 Bit Incorporated having six 10 amp relays. A laptop 850 with a wireless adapter wirelessly communicates with the wireless router 840 to control either the Ethernet control relay switch 830 to selectively power one or more LED lighting packages, the potentiometer 820 to vary together the brightness level of LED lighting packages, or both.

The power supplies of lamp assemblies 810A-810F receive input from an alternating current (AC) power source (not shown). The AC power source may provide 120 volts (V) at 20 amps (A) or a range of 220 V-240V at 20 A. The input AC power runs between 50 and 60 hertz (Hz). Referring to LED lighting packages 300 and 500, the output power of the power supplies of lamp assemblies 810A-810F matches the DC operating conditions of those assemblies or may alternatively be designed to provide power for up to six columns of 20 serially connected LEDs where each column is electrically connected in parallel. A typically, operating range for an LED is to receive constant current of about 350 mA.

In operation, the Ethernet control relay switch 830 is controlled by a laptop or a programmed smart lighting computer system 850 represented in FIG. 8 thereby. Additionally, sensors 812A-F, such as optical sensors, motion sensors, internal sensors or the like are associated with each light assembly 810A-810F. The potentiometer is manually controlled or controlled by computer system 850 to, in turn, vary the output voltage of power supplies to simultaneously vary the outputs of their LED lighting packages 810A-810F. The combination of relay control and brightness control of the LED lighting packages provides an advantageous adjustability. Computer system 850 subject to software control may alternatively control both the potentiometer 820 and Ethernet control relay switch 830 so that the LED lighting packages 810A-810F emit lighting adapted to sensed ambient light conditions, and smart emergency lighting can also be provided.

As an example, three of the six lighting packages, 810A-810C, may be distributed along a hallway which no external light source and the other three packages 810D-810F may provide light for a large corner office with many windows. When power is lost on a sunny day, the sensors 812A-812C when implemented as optical sensors will sense the hallway has gone dark and then their inputs can be utilized in conjunction with the detection of power loss to switch packages 810A-810C to battery mode to provide emergency exit lighting. Conversely, sensors 812D-812F in the corner office may detect sufficient outside light so that packages 810D-810F need not be turned on even though AC power has been lost. If the same power outage occurred at night, packages 810D-810F would also be turned on.

As one further example, a motion detector may be utilized to detect human movement and to provide lighting by packages in the vicinity of the detected movement for a predetermined period of time. It will be recognized that the present invention allows a highly flexible response to an emergency lighting situation.

FIG. 9 illustrates a process 900 of providing emergency auxiliary lighting in accordance with the present invention. In step 902, a loss of power is detected by an LED package with emergency lighting. In step 904, the LED package is switched from a normal ambient lighting mode to a battery powered auxiliary lighting mode. In step 906, the LED package provides auxiliary lighting until its battery runs low or until power is returned. In addition to detecting loss of power, a further precursor condition to switching modes in step 904 may be detecting a drop in light level below a predetermined threshold.

While the present invention has been disclosed in the context of various aspects of presently preferred embodiments including specific package detail, it will be recognized that the invention may be suitably applied to other environments including different package dimensions and LED module arrangements consistent with the claims which follow.

We claim:

1. An integrated light emitting diode (LED) lighting package providing both normal room lighting and auxiliary emergency lighting comprising:
   an array of LEDs powered by an alternating current power source and providing normal room lighting in a normal mode of operation;
   an auxiliary power source; and
   a control circuit to deliver power from the auxiliary power source to at least a plurality of the LEDs in the array of LEDs upon loss of power from the alternating current power source to provide auxiliary emergency lighting in an auxiliary mode.

2. The lighting package of claim 1 wherein the LEDs of the array of LEDs are arranged in columns and all of the columns are lit in the normal mode of operation and one or more but less than all of the columns are lit in the auxiliary mode.

3. The lighting package of claim 1 wherein the LEDs of the array of LEDs are operating at a full power level during the normal mode and at a reduced power level during the auxiliary mode.

4. The lighting package of claim 3 wherein the control circuit employs pulse width modulation to control said reduced power level.

5. The lighting package of claim 1 wherein the auxiliary power source comprises a battery and said package further comprises charging circuitry to maintain the battery supply at substantially full charge when the battery is not in use.

6. The lighting package of claim 1 wherein the auxiliary power source comprises a battery and said package further comprises charging circuitry to recharge the battery to substantially full charge after the battery has been used.

7. The lighting package of claim 1 further comprising a smart control system to adjust the auxiliary emergency lighting in the auxiliary mode as needed.

8. The lighting package of claim 1 further comprising a sensor to detect room lighting in a vicinity of the lighting package.

9. The lighting package of claim 8 wherein the sensor produces an output signal indicative of detected room lighting in the vicinity of the lighting package and the output signal is utilized by the control circuit to adjust light output level in the auxiliary mode.

10. The lighting package of claim 1 further comprising a motion detector to detect human movement and wherein the control circuit controls the providing auxiliary emergency lighting to be only for a predetermined time after detection of said movement.

11. A method providing both normal room lighting and auxiliary emergency lighting utilizing an integrated light emitting diode (LED) lighting package, the method comprising:
   powering an array of LEDs with an alternating current power source to provide normal room lighting in a normal mode of operation;
   supplying backup power from a backup power supply in an auxiliary mode; and
   utilizing a control to selectively deliver power from the backup power supply to at least a plurality of the LEDs in the array of LEDs upon loss of power from the alternating current power source to provide auxiliary emergency lighting in the auxiliary mode.

12. The method of claim 11 wherein the LEDs of the array of LEDs are arranged in columns and all of the columns are lit in the normal mode of operation and one or more but less than all of the columns are lit in the auxiliary mode.

13. The method of claim 11 wherein the LEDs of the array of LEDs are operating at a full power level during the normal mode and at a reduced power level during the auxiliary mode.

14. The method of claim 13 further comprising employing pulse width modulation to control said reduced power level.

15. The method of claim 11 wherein said backup power supply comprises a battery, and the method further comprises utilizing charging circuitry to maintain the battery at substantially full charge when the battery is not in use.

16. The method of claim 11 wherein said backup power supply further comprises utilizing charging circuitry to recharge the battery supply to substantially full charge after the battery supply has been used.

17. The lighting package of claim 11 further comprising adjusting the auxiliary emergency lighting in the auxiliary mode as needed utilizing a smart control system.

18. The method of claim 11 further comprising detecting room lighting in a vicinity of the lighting package utilizing a sensor.

19. The method of claim 11 further comprising producing an output signal indicative of detected room lighting in a vicinity of the lighting package by a sensor and utilizing the output signal by the control circuit to adjust light output level in the auxiliary mode.

20. The method of claim 11 further comprising detecting human movement with a motion detector; and
   controlling the providing auxiliary emergency lighting to be only for a predetermined time after detection of said movement.

21. The lighting package of claim 1 wherein the array of LEDs comprises a set of LEDs and said at least a plurality of the LEDs comprises a subset of less than all of the LEDs in the set of LEDs.

22. The method of claim 11 wherein the array of LEDs comprises a set of LEDs and said at least a plurality of the LEDs comprises a subset of less than all of the LEDs in the set of LEDs.

* * * * *